United States Patent
Mizutani et al.

(10) Patent No.: US 7,996,831 B2
(45) Date of Patent: Aug. 9, 2011

(54) OFFICE EQUIPMENT AND PROGRAM INSTALLATION SUPPORT METHOD

(75) Inventors: Akihiro Mizutani, Tokyo (JP); Kazuhiro Ogura, Kanagawa-ken (JP); Shinji Makishima, Tokyo (JP); Toshihiro Ida, Tokyo (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1039 days.

(21) Appl. No.: 11/676,328

(22) Filed: Feb. 19, 2007

(65) Prior Publication Data

US 2008/0201704 A1    Aug. 21, 2008

(51) Int. Cl.
G06F 9/445  (2006.01)
G06F 9/45  (2006.01)

(52) U.S. Cl. .................. 717/174; 717/171; 717/176

(58) Field of Classification Search .......... 717/171–177; 709/203–204
See application file for complete search history.

(56) References Cited

U.S. PATENT DOCUMENTS

| | | | | |
|---|---|---|---|---|
| 5,870,609 | A * | 2/1999 | Thornton et al. | 717/175 |
| 5,870,610 | A * | 2/1999 | Beyda | 717/173 |
| 6,922,831 | B1 * | 7/2005 | Kroening et al. | 717/172 |
| 6,976,252 | B2 * | 12/2005 | White et al. | 717/174 |
| 7,020,598 | B1 * | 3/2006 | Jacobson | 703/14 |
| 7,107,588 | B2 * | 9/2006 | Gentry | 717/176 |
| 7,150,025 | B2 * | 12/2006 | Gentry et al. | 719/327 |
| 7,216,344 | B2 * | 5/2007 | Cobb et al. | 717/174 |
| 7,237,238 | B2 * | 6/2007 | Peppers et al. | 717/170 |
| 7,251,812 | B1 * | 7/2007 | Jhanwar et al. | 717/171 |
| 7,287,253 | B2 * | 10/2007 | Yamamura et al. | 717/176 |
| 7,328,434 | B2 * | 2/2008 | Swanson et al. | 717/168 |
| 7,334,227 | B2 * | 2/2008 | Kim et al. | 717/178 |
| 7,401,113 | B1 * | 7/2008 | Appiah et al. | 709/203 |
| 7,600,226 | B2 * | 10/2009 | Aiba et al. | 717/171 |
| 7,660,847 | B2 * | 2/2010 | Bezanson et al. | 709/203 |
| 7,743,374 | B2 * | 6/2010 | Machida | 717/176 |
| 7,793,285 | B2 * | 9/2010 | Hattori et al. | 717/174 |
| 7,805,722 | B2 * | 9/2010 | Mori et al. | 717/178 |
| 7,849,461 | B2 * | 12/2010 | Hsieh | 717/174 |
| 7,865,892 | B2 * | 1/2011 | Motoki et al. | 717/174 |

FOREIGN PATENT DOCUMENTS

| | | |
|---|---|---|
| JP | 2004-030280 | 1/2004 |
| JP | 2004-334785 | 11/2004 |

OTHER PUBLICATIONS

Cho et al, "D bus based user device driver framework design or linux mobile software platform", IEEE, pp. 426-431, 2009.*
Zurong et al, "An integrated expansion USB bridge for ISA data acquisition card", IEEE, pp. 1-6, 2007.*
Watanabe et al "Pseudo real time control of a USB I/O device under Windows 7", IEEE ICROS, pp. 975-980, 2010.*
Spear et al, "Solving the starting problem: device drivers as self describing artificats", ACM EuroSys, pp. 45-57, 2006.*

* cited by examiner

Primary Examiner — Anil Khatri
(74) Attorney, Agent, or Firm — Turocy & Watson, LLP

(57) ABSTRACT

An apparatus and a method are provided to enable simple and easy installation of a driver program, on an external apparatus, for controlling office equipment from the external apparatus regardless of a positional relation between the office equipment and the external apparatus. The office equipment, controllable by the external apparatus with a predetermined driver program, can include a request accepting unit configured to accept an acquisition request for predetermined information that facilitates installation of the driver program on the external apparatus. The office equipment can further include an information transmitting unit configured to transmit the predetermined information to a storage device capable of communicating with the external apparatus.

8 Claims, 8 Drawing Sheets

FIG.2

| EMPLOYEE NUMBER | 000111 | 000112 | 000113 |
|---|---|---|---|
| CARD ID | 00010?···07 | 08090a···0f | 1f2e3d···78 |
| OS IN USE | Windows98 | Windows2000 | WindowsXP |

OFFICE EQUIPMENT AND PROGRAM INSTALLATION SUPPORT METHOD

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

BACKGROUND OF THE INVENTION

1. Field of the Invention

The present invention relates to a program installation support technique for installing a driver program for controlling office equipment from an external apparatus in the external apparatus.

2. Description of the Related Art

Conventionally, when a driver program for controlling office equipment such as a printer from an external apparatus is installed in the external apparatus, a user needs to check a storage location of information necessary for installing a driver and an IP address for specifying the office equipment. This takes a lot of time for the user.

As a related technique, there is known a technique for receiving, in a cellular phone, a general-purpose printer driver from a printer side and installing the printer driver in the cellular phone, creating print data of an image about to be printed using the printer driver installed, and transmitting the print data to the printer from the cellular phone (see JP-A-2004-334785).

However, the conventional technique is entirely a technique for making it possible to control the printer and the like from a mobile device such as a cellular phone. It is impossible to apply the technique between apparatuses that are not easily brought close to each other like office equipment such as a printer and a desktop PC.

The invention has been devised to solve the problems described above and it is an object of the invention to provide a technique that can make, when a driver program for controlling office equipment from an external apparatus is installed in the external apparatus, work for the installation simple and easy regardless of a positional relation between the office equipment and the external apparatus.

DESCRIPTION OF THE DRAWINGS

FIG. 2 is a data table showing an example of information for authentication and the like stored in a database 4;

DETAILED DESCRIPTION OF THE INVENTION

An embodiment of the invention will be hereinafter explained with reference to the drawings.

Throughout this description, the embodiments and examples shown should be considered as exemplars, rather than limitations on the apparatus, methods and programs of the present invention.

Figure 1:
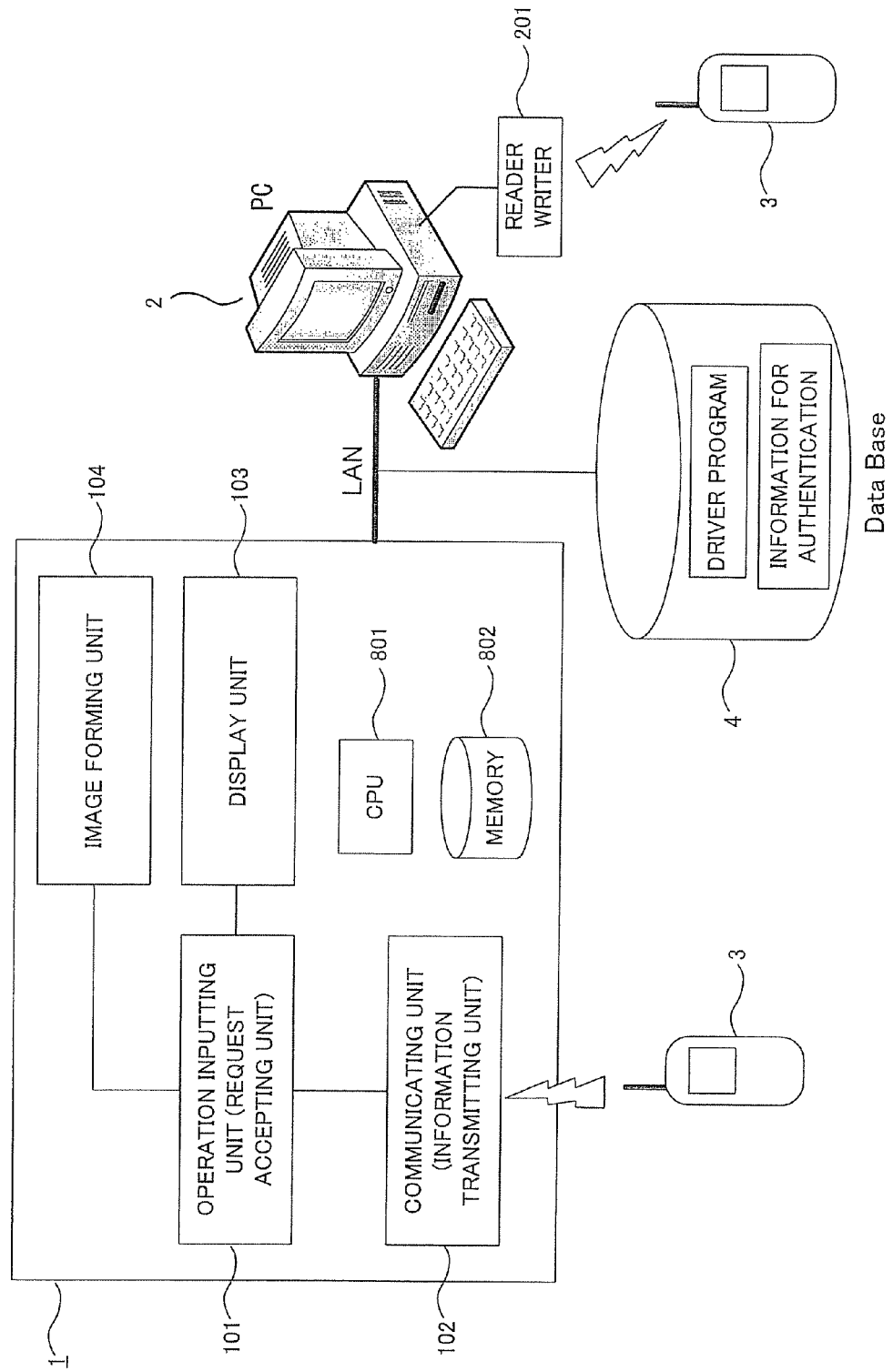
FIG. 1 is a functional block diagram for explaining office equipment and a network structure including the office equipment according to an embodiment of the invention.

FIG. 1 is a functional block diagram for explaining office equipment and a network structure including the office equipment according to an embodiment of the invention. Office equipment 1 according to this embodiment is an image forming apparatus such as an MFP (Multi Function Peripheral) or a printer. By installing a predetermined driver program in a PC (Personal Computer) 2 (an external apparatus) communicatably connected to the office equipment 1, it is possible to control the office equipment 1 from the PC 2. In this embodiment, an example in which the office equipment 1 is an MFP will be hereinafter described.

Other than controlling the office equipment 1 using the driver program described above, the PC 2 instructs the office equipment 1 to perform image formation processing and the like based on image data and the like stored in a storage area in the PC 2. The PC 2 includes a reader writer 201 that is capable of reading data stored in a non-contact IC card and writing data in the non-contact IC card.

A portable terminal (a portable communication terminal) 3 is, for example, a cellular phone, a PDA, or a mobile PC mounted with a non-contact IC card. The portable terminal 3 is capable of exchanging data with the reader writer 201 for the non-contact IC card and a communicating unit 102 described later via the non-contact IC card.

In this embodiment, the portable terminal 3 is capable of communicating with both the office equipment 1 and the PC 2. A communication system between the portable terminal 3 and the office equipment 1 and a communication system between the portable terminal 3 and the PC 2 do not always have to be identical. The communication systems may be any communication systems as long as data acquired by the portable terminal 3 from the office equipment 1 can be transferred from the portable terminal 3 to the PC 2 (e.g., data transmission from the portable terminal 3 to the office equipment 1 is performed via a non-contact IC tag and data transmission from the portable terminal 3 to the PC 2 is performed via a USB port or an infrared-ray communication port). In this embodiment, the example in which the portable terminal 3 is a terminal apparatus such as a cellular phone is cited. However, the portable terminal 3 is not limited to this. The portable terminal 3 may be, for example, a USB memory, a CD-R, or a flexible disk (a predetermined storage medium) as long as the portable terminal 3 is capable of communicating with both the office equipment 1 and the PC 2 (data writing by the office equipment 1 and data reading by the PC 2 are possible).

A database 4 is constituted by an HDD or the like and communicatably connected to the office equipment 1 and the PC 2 via a LAN. The database 4 has a role of storing information and data that are referred to in the office equipment 1 and the PC 2. In the office equipment 1 and the PC 2, it is possible to perform predetermined authentication processing on the basis of ID information and the like read from the non-contact IC card provided in the portable terminal 3 and information for authentication stored in the database 4. FIG.

2 is a data table showing an example of the information for authentication and the like stored in the database 4.

A detailed structure of the office equipment 1 will be explained. The office equipment 1 according to this embodiment includes an operation inputting unit 101, a communicating unit 102, a display unit 103, an image forming unit 104, a CPU 801, and a MEMORY 802.

The operation inputting unit (a request accepting unit (request accepting means)) 101 is constituted by, for example, a keyboard and a mouse and accepts an operation input of a user (an acquisition request for information concerning processing for installation of a driver program for the office equipment 1, etc.).

The communicating unit (an information transmitting unit (information transmitting means)) 102 transmits, when the acquisition request is accepted by the request accepting unit 101, predetermined information necessary for installation of the driver program for the office equipment 1 in the PC 2 to the portable terminal (a storage device) 3 capable of communicating with the PC 2. Specifically, the communicating unit 102 is constituted by, for example, a reader writer capable of communicating with a non-contact IC card.

Here, the "predetermined information" means information necessary for execution of the processing for installation of the driver program such as "an install program itself used for installation of the driver program" or "information indicating a location of the install program used for installation of the driver program".

It is preferable that, for example, an IP address is included in this "predetermined information" as information for specifying office equipment requested when office equipment is controlled by the driver program for the office equipment 1.

The display unit 103 is constituted by, for example, a liquid crystal display and has a role of displaying contents of various kinds of processing in the office equipment 1 on a screen. The operation inputting unit 101 and the display unit 103 may be integrally formed by, for example, a touch panel display.

The CPU 801 has a role of performing various kinds of processing in the office equipment 1. The CPU 801 also has a role of realizing various functions by executing programs stored in the MEMORY 802. The MEMORY 802 is constituted by, for example, a ROM or a RAM and has a role of storing various kinds of information and programs used in the office equipment 1.

Figure 3:
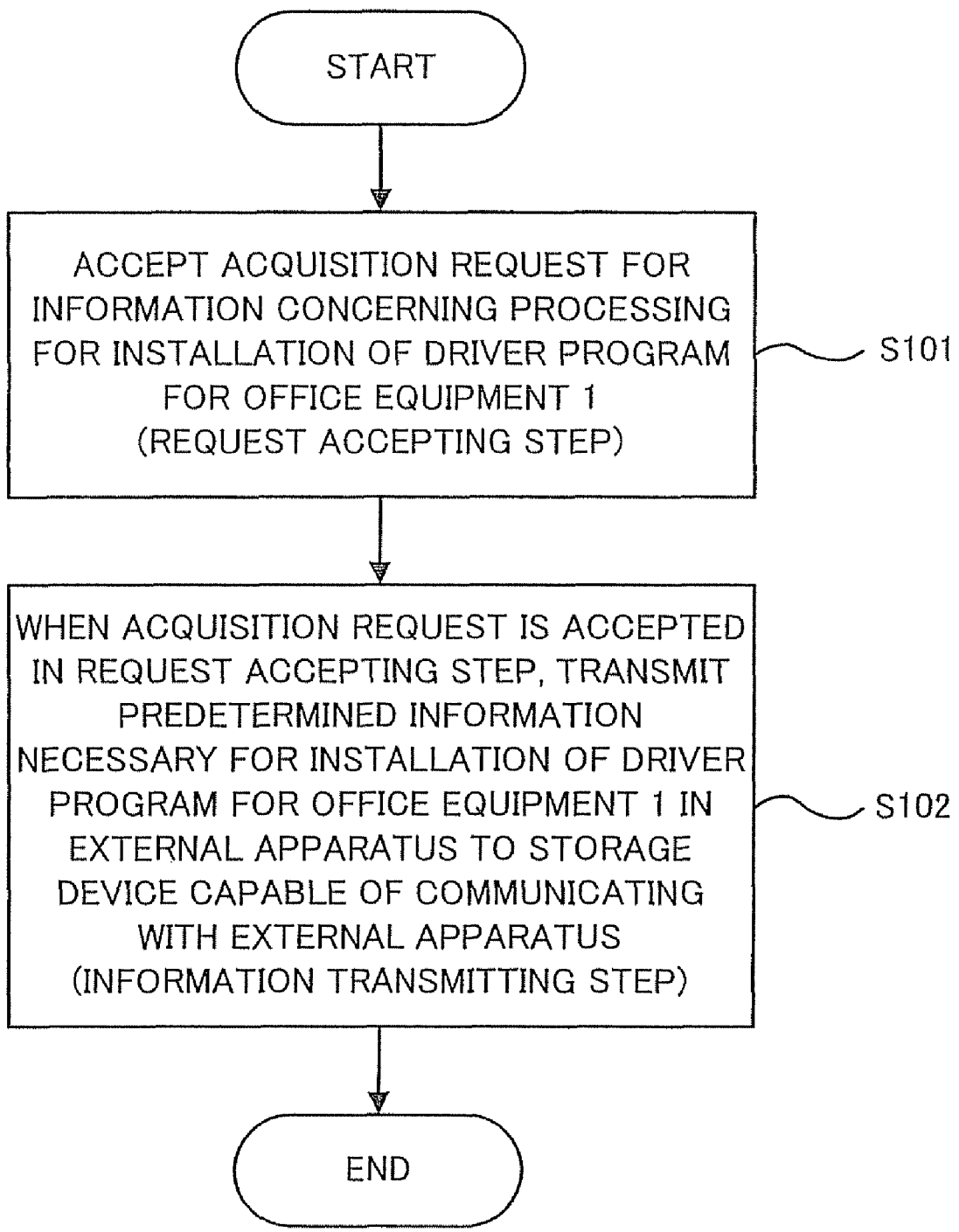
FIG. 3 is a flowchart for explaining a rough flow of processing (a program installation support method) in office equipment 1 according to the embodiment.

FIG. 3 is a flowchart for explaining a rough flow of the processing (the program installation support method) in the office equipment 1 according to this embodiment.

First, the operation inputting unit 101 accepts an acquisition request for information necessary for processing for installation of the driver program for the office equipment 1 (a request accepting step) (S101).

The communicating unit 102 transmits, when the acquisition request is accepted in the request accepting step, predetermined information necessary for installation of the driver program for the office equipment 1 in an external apparatus to a storage device capable of communicating with the external apparatus (an information transmitting step) (S102).

Figure 4:
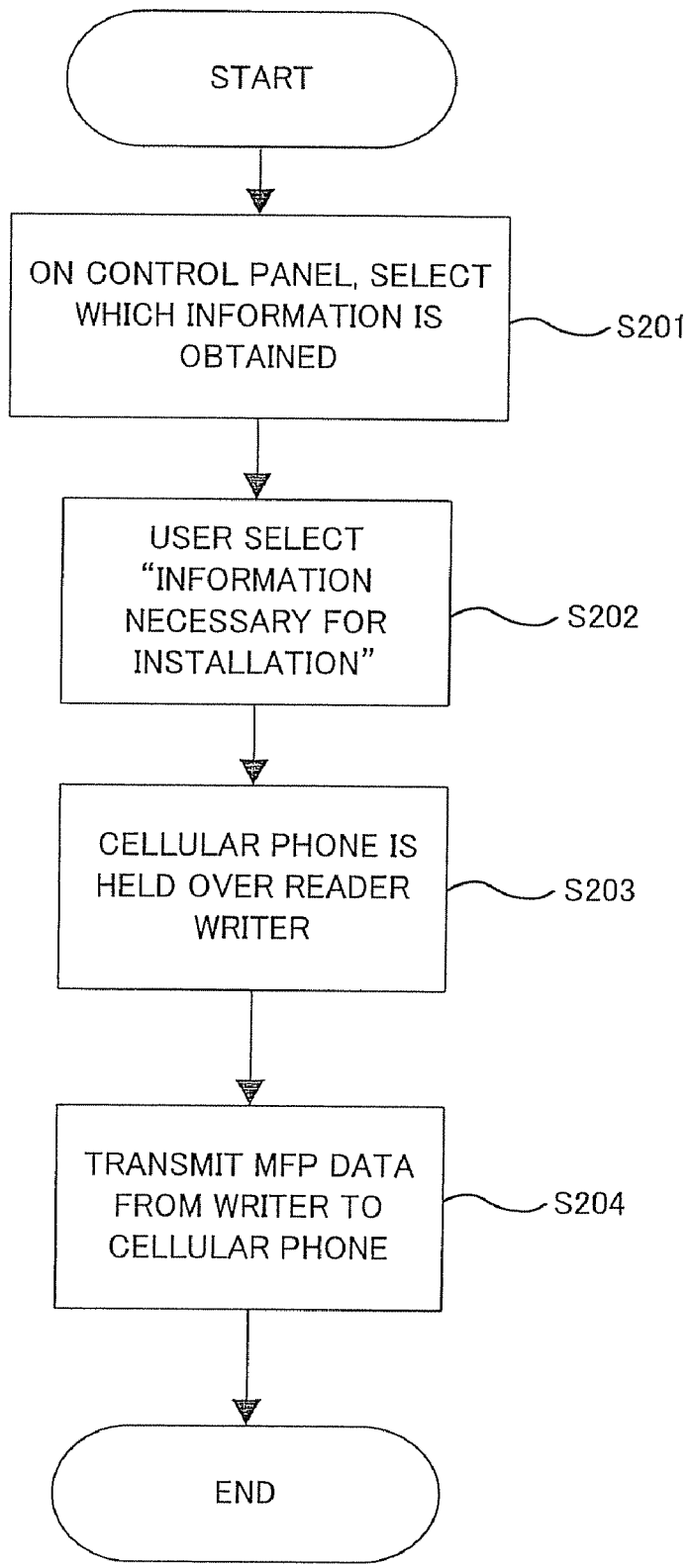
FIG. 4 is a flowchart for explaining details of a flow of processing for writing data in a portable terminal 3 in the office equipment 1 according to the embodiment.

FIG. 4 is a flowchart for explaining details of a flow of processing for writing data in the portable terminal 3 in the office equipment 1 according to this embodiment.

Figure 5:
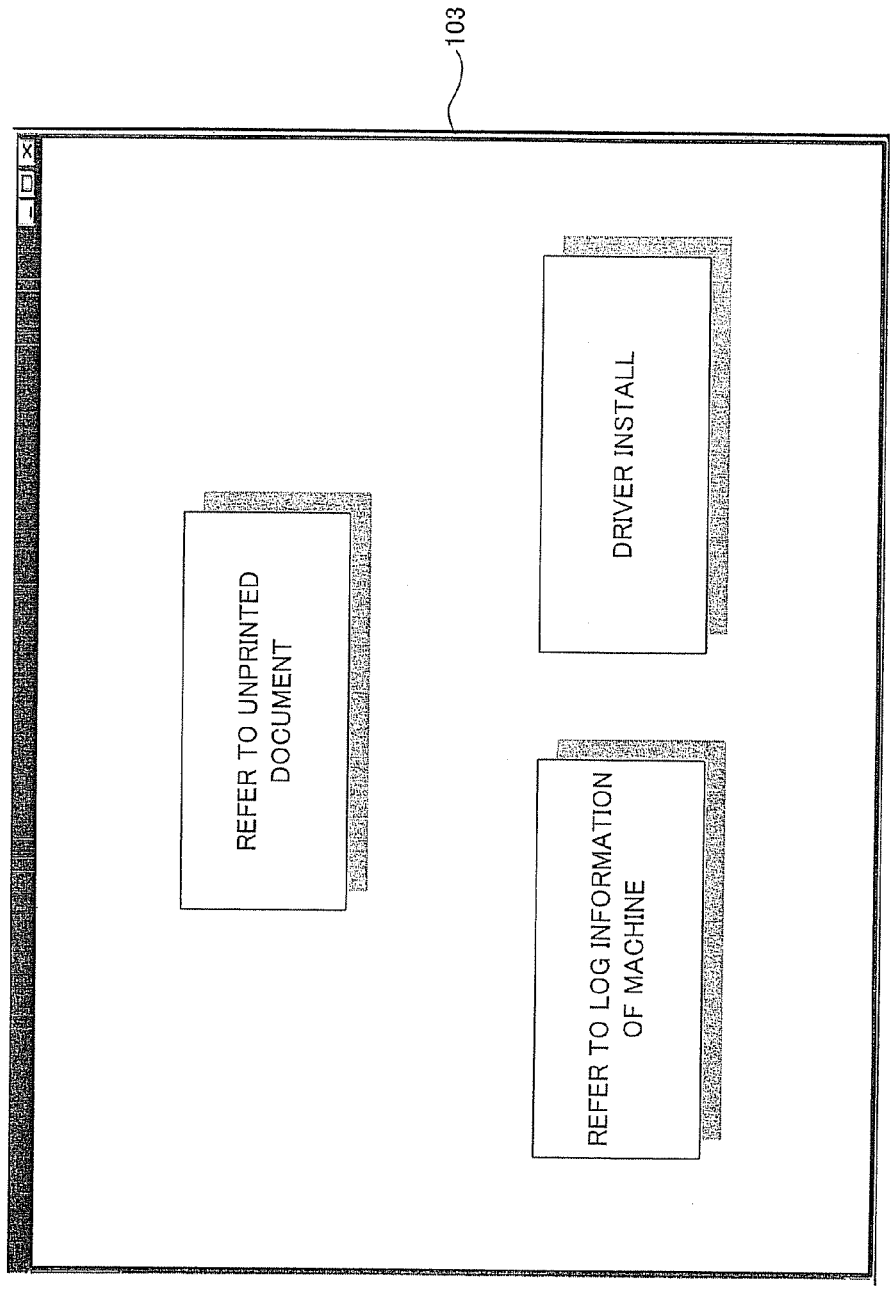
FIG. 5 is a diagram showing an example of screen display in a display unit 103 of the office equipment 1.

On a screen shown in FIG. 5 displayed on the display unit 103 of the office equipment 1, an operation input to the operation inputting unit 101 by the user is accepted (S201). On the screen shown in FIG. 5, as an example, buttons of three items "reference to an unprinted document", "reference to log information of a machine", and "driver install" are displayed to be arbitrarily selectable.

Figure 6:
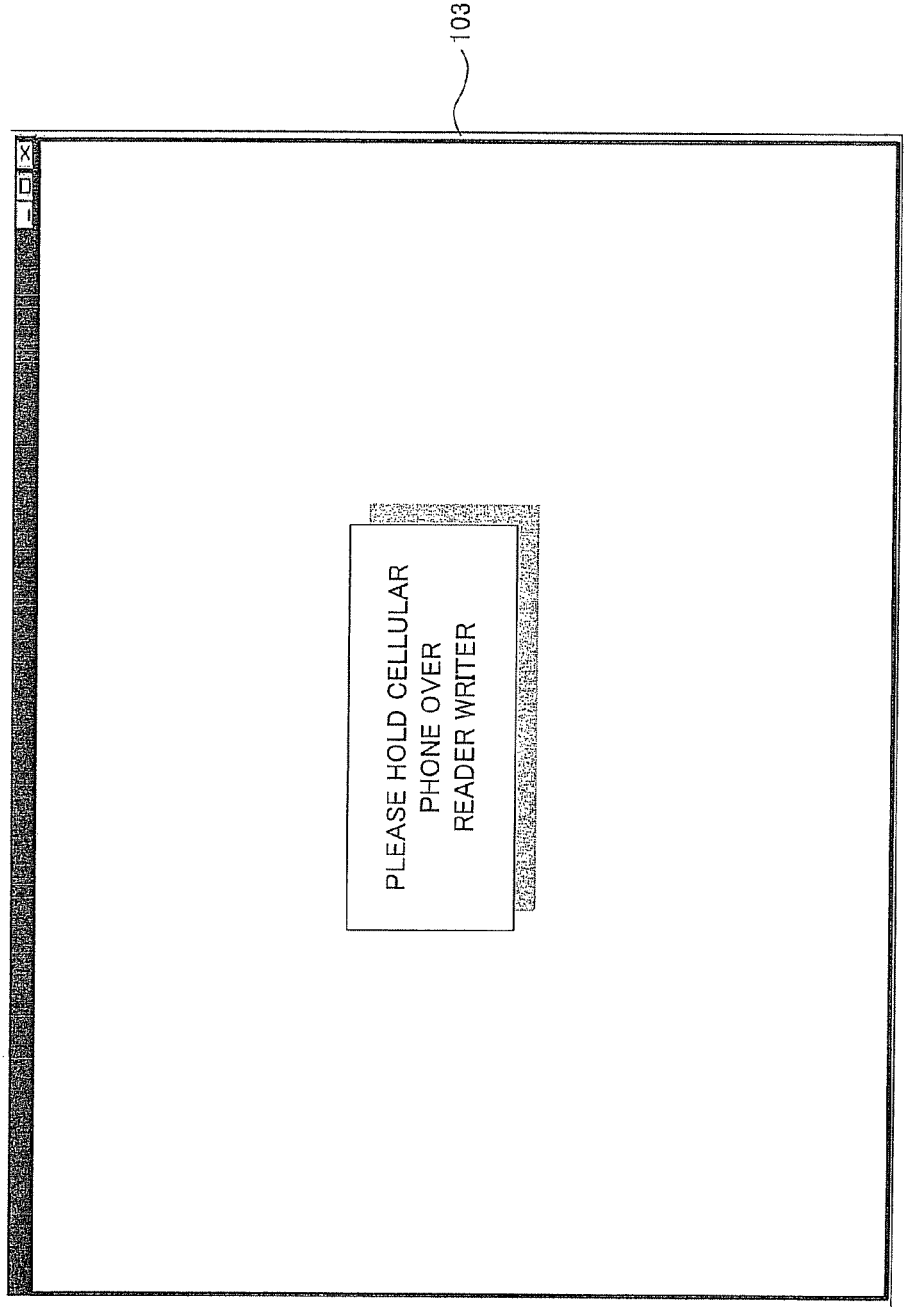
FIG. 6 is a diagram showing an example of screen display in the display unit 103 of the office equipment 1.

On the screen shown in FIG. 5, when the user selects "driver install" (S202), a screen shown in FIG. 6 is displayed on the display unit 103.

Subsequently, when the user holds the portable terminal 3 over the reader writer provided in the communicating unit 102 in the office equipment 1 (S203), the communicating unit (the reader writer) 102 of the office equipment 1 detects that the portable terminal 3 is held over the communicating unit 1 and writes requested data (an IP address of the office equipment 1, link to a storage location on the database 4 in which the driver program is stored, etc.) in the non-contact IC card provided in the portable terminal 3 (S204). After the processing described above, information necessary for installation of the driver program for the office equipment 1 is stored in a storage area of the portable terminal 3.

Figure 7:
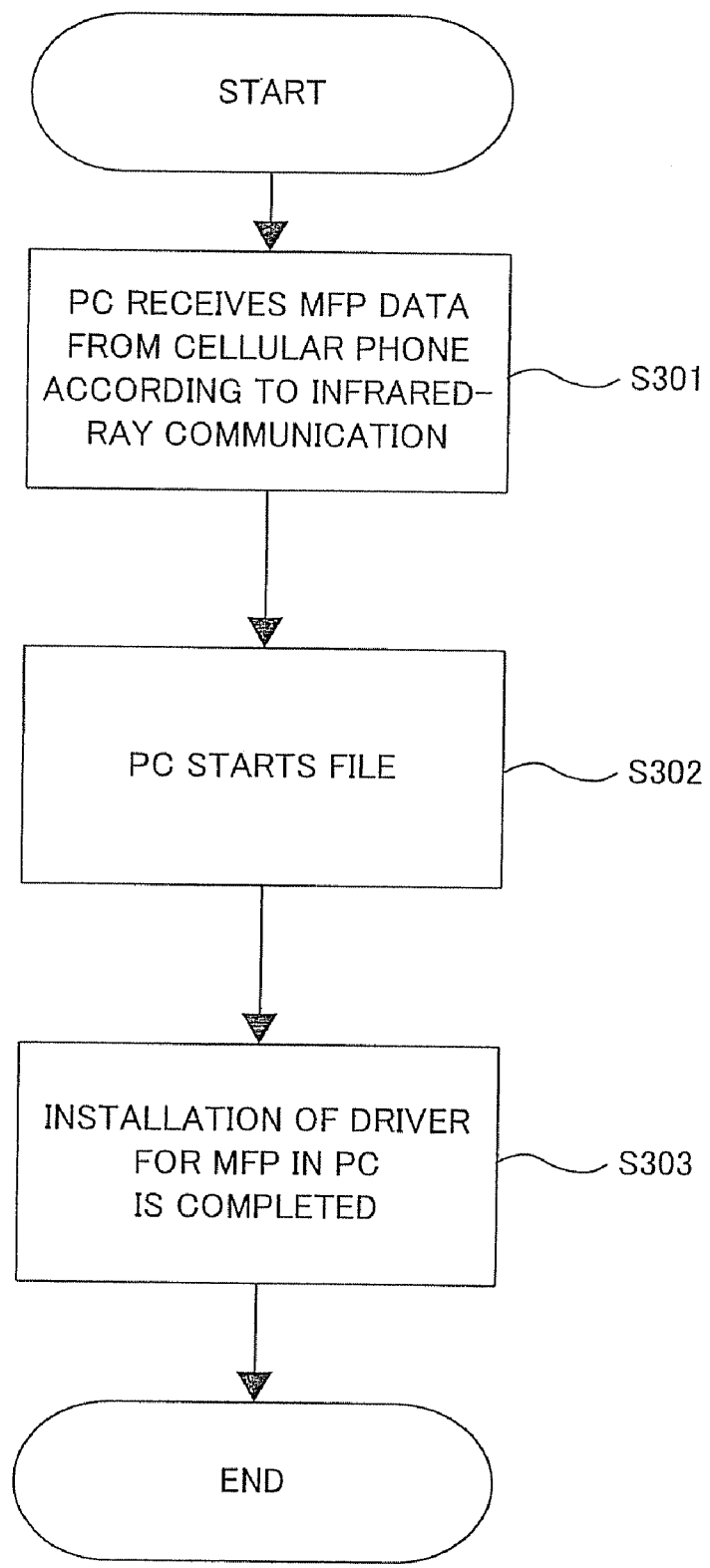
FIG. 7 is a flowchart for explaining details of a flow of processing for transmitting data from the portable terminal 3 to a PC 2 according to the embodiment.

FIG. 7 is a flowchart for explaining details of a flow of processing for data transmission from the portable terminal 3 to the PC 2 according to this embodiment.

First, the PC 2 receives the "information necessary for installation of the driver program for the office equipment 1" from the portable terminal 3 according to infrared-ray communication, an E-mail, communication between the non-contact IC card of the portable terminal 3 and the reader writer 201, or the like (S301).

When the data transmitted from the portable terminal 3 to the PC 2 side is a program automatically executed on the PC 2 side (e.g., when a function for automatically executing a program file with a specific extension and file name is prepared), the program is automatically executed by the PC 2 (S302). The processing for installation of the driver program for the office equipment 1 in the PC 2 is automatically finished (S303).

Usually, in installation of a driver program, work such as designation of a port is necessary in order to specify an apparatus to be controlled. However, in this case, since information such as an IP address is included in the received data, burdens of setting of an IP address in installation work of the user and the like are reduced by a great degree.

Figure 8:
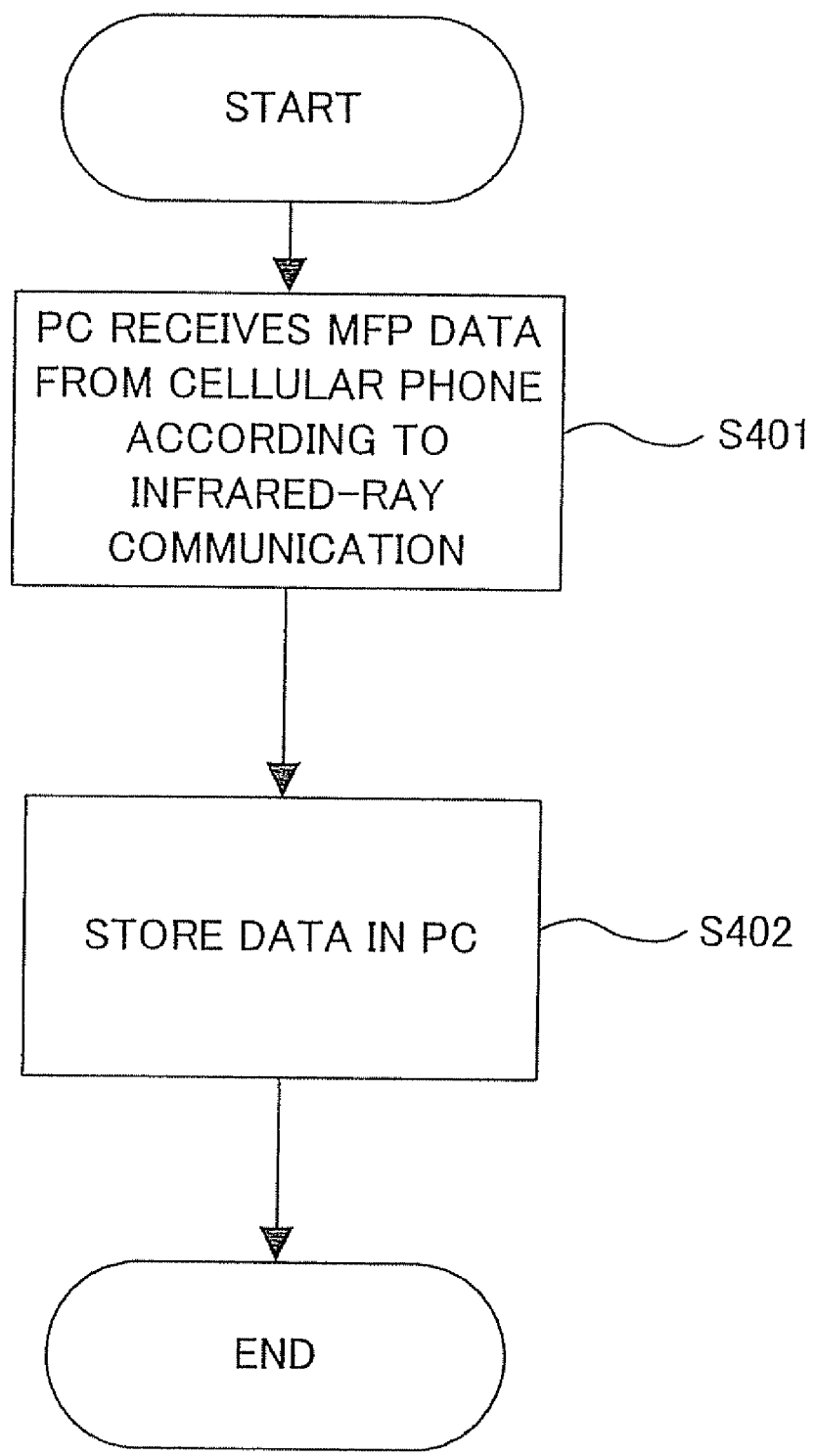
FIG. 8 is a flowchart for explaining details of another example of the flow of the processing for transmitting data from the portable terminal 3 to the PC 2 according to the embodiment.

FIG. 8 is a flowchart for explaining details of another example of the flow of the processing for data transmission from the portable terminal 3 to the PC 2 according to this embodiment. In FIG. 8, a flow of processing in the case in which a program received from the portable terminal 3 cannot be automatically executed on the PC 2 side is shown.

First, the PC 2 receives the "information necessary for installation of the driver program" for the office equipment 1 from the portable terminal 3 according to infrared-ray communication or the like (S401).

Data received on the PC 2 side as described above is stored in the storage area in the PC 2 (S402). In the example shown in the figure, the user needs to manually execute the processing for installation of the driver program. However, since the storage location in the database 4 of the file required for installation of the driver program and the IP address of the office equipment 1 have been acquired as information required for installation work, it is possible to perform the installation work more simply and easily than in the pat.

The respective steps in the processing in the office equipment 1 are realized by causing the CPU 801 to execute a program installation support program stored in the MEMORY 802.

In the explanation of this embodiment, functions for carrying out the invention are recorded in the apparatus in advance. However, the invention is not limited to this. The same functions may be downloaded to the apparatus from the network or the same functions stored in a recording medium may be installed in the apparatus. A form of the recording medium may be any form as long as the recording medium is a recording medium that can store a program and is readable by the apparatus such as a CD-ROM. The functions obtained by installation or download in advance in this way may be realized in cooperation with an OS (operating system) or the like in the apparatus.

Further, it is also possible to store OSs of PCs, which users mainly use, in the data table of the database 4 in association with user IDs as shown in FIG. 2 and, when a request for information concerning a driver program is received from a user, transmit information for installing a driver program suitable for an OS assumed to be used by the user (registered in association with a user ID) to the portable terminal 3.

In the embodiment described above, the example in which the information required for installation of the driver program for the office equipment 1 in the PC 2 is exchanged as data is described. However, the invention is not limited to this. For example, it is also possible that information required for installation of the driver program for the office equipment 1 in the PC 2 (information for specifying a location of a file necessary for installation of the driver program and the office equipment 1) is printed on a sheet by the image forming unit 104 and the user installs the driver program in the PC 2 while referring to the sheet having the information printed thereon. In this way, a constitution for once holding the information required for the installation processing on a paper medium can also contribute to reduction of burdens of the installation work.

In the embodiment described above, the example in which the office equipment 1 is an image forming apparatus is described. However, the invention is not limited to this. For example, it is possible to apply the invention to apparatuses that can be controlled from an external apparatus according to a driver program such as an image scanning apparatus, an image processing apparatus, and an imaging apparatus.

A program installation support program according to this embodiment is a program installation support program for causing a computer to execute processing for supporting work for installing a driver program for controlling office equipment from an external apparatus in the external apparatus. The program installation support program causes the computer to execute a request accepting step of accepting an acquisition request for information necessary for installation processing for the driver program and an information transmitting step of transmitting, when the acquisition request is accepted in the request accepting step, predetermined information necessary for installation of the driver program in the external apparatus to a storage device capable of communicating with the external apparatus.

As described above, whereas it is necessary to check, when a driver program for a certain apparatus is installed in an external apparatus, an IP address of the apparatus and searching for a storage location of the driver program in the conventional technique, according to this embodiment, it is possible to omit the work. In some cases, the user is capable of installing the driver program in the PC 2 and setting a port without performing special work.

The invention has been explained in detail according to the specific forms. However, it is obvious for those skilled in the art that various modifications and alterations can be made without departing from the spirit and the scope of the invention.

As described above in detail, according to the invention, it is possible to provide a technique that can make, when a driver program for controlling office equipment from an external apparatus is installed in the external apparatus, work for the installation simple and easy regardless of a positional relation between the office equipment and the external apparatus.

What is claimed is:

1. Office equipment that is controllable by a predetermined driver program from an external apparatus, comprising:
 a processor configured to execute:
 a request accepting unit configured to accept an operation input by a user as an acquisition request for predetermined information necessary for processing for installation of the driver program in the external apparatus; and
 an information transmitting unit configured to accept ID information of the user, to select the predetermined information necessary corresponding to the ID information from a database, and to transmit the predetermined information necessary to a storage device capable of communicating with the external apparatus, if the acquisition request is accepted by the request accepting unit,
 wherein the predetermined information is information indicating a location of an installation program used for installation of the driver program; wherein the storage device is a non-contact IC card, and
 the information transmitting unit is a reader writer capable of communicating with the non-contact IC card.

2. Office equipment according to claim 1, wherein the storage device is a portable communication terminal or a predetermined storage medium capable of communicating with the office equipment.

3. Office equipment that is controllable by a predetermined driver program from an external apparatus, comprising:
 a processor configured to execute:
 a request accepting unit configured to accept an operation input by a user as an acquisition request for predetermined information necessary for processing for installation of the driver program in the external apparatus; and
 an information transmitting unit configured to accept ID information of the user, to select the predetermined information necessary corresponding to the ID information from a database, and to transmit the predetermined information necessary to a storage device capable of communicating with the external apparatus, if the acquisition request is accepted by the request accepting unit,
 wherein the predetermined information includes information for specifying the office equipment requested when the office equipment is controlled by the driver program, wherein information for specifying the office equipment is an IP address; wherein the storage device is a non-contact IC card, and
 the information transmitting unit is a reader writer capable of communicating with the non-contact IC card.

4. Office equipment according to claim 3, wherein the storage device is a portable communication terminal or a predetermined storage medium capable of communicating with the office equipment.

5. A program installation support method for installing a driver program for controlling office equipment from an external apparatus in the external apparatus, the program installation support method being performed on a processor of the office equipment and comprising the steps of:
 accepting an operation input by a user as an acquisition request for predetermined information necessary for installation processing for the driver program in the external apparatus;
 accepting ID information of the user;
 selecting the predetermined information necessary corresponding to the ID information from a database; and transmitting the predetermined information necessary to a storage device capable of communicating with the external apparatus, if the acquisition request is accepted, wherein the predetermined information is information indicating a location of an installation program used for installation of the driver program.

6. A program installation support method according to claim 5, wherein the storage device is a portable communication terminal or a predetermined storage medium capable of communicating with the office equipment.

7. A program installation support method for installing a driver program for controlling office equipment from an external apparatus in the external apparatus, the program installation support method being performed on a processor of the office equipment and comprising the steps of:

accepting an operation input by a user as an acquisition request for predetermined information necessary for installation processing for the driver program in the external apparatus;

accepting ID information of the user;

selecting the predetermined information necessary corresponding to the ID information from a database; and transmitting the predetermined information necessary to a storage device capable of communicating with the external apparatus, if the acquisition request is accepted, wherein the predetermined information includes information for specifying the office equipment requested when the office equipment is controlled by the driver program and wherein information for specifying the office equipment is an IP address.

8. A program installation support method according to claim 7, wherein the storage device is a portable communication terminal or a predetermined storage medium capable of communicating with the office equipment.

* * * * *